(12) United States Patent
Suzuki et al.

(10) Patent No.: US 6,504,813 B2
(45) Date of Patent: Jan. 7, 2003

(54) APPARATUS FOR DRIVING A LENS FOR USE WITH A DISK PLAYER

(75) Inventors: Jun Suzuki, Tokorozawa (JP); Eiji Kuroki, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 88 days.

(21) Appl. No.: 09/778,846

(22) Filed: Feb. 8, 2001

(65) Prior Publication Data

US 2001/0026528 A1 Oct. 4, 2001

(30) Foreign Application Priority Data

Feb. 8, 2000 (JP) .................................... 2000-029997

(51) Int. Cl.[7] .......................... G11B 17/00; G11B 21/16
(52) U.S. Cl. ..................................................... 369/244
(58) Field of Search ............................... 369/244, 44.14, 369/44.15, 44.16, 112.23, 176; 360/240, 294.5, 294.3, 294.1, 294, 290

(56) References Cited

U.S. PATENT DOCUMENTS 5,617,256 A * 4/1997 Mitsumori et al. ......... 359/814
5,777,972 A * 7/1998 Furusawa ................. 369/44.14
6,285,650 B1 * 9/2001 Park ......................... 369/244

* cited by examiner

Primary Examiner—Robert S. Tupper
Assistant Examiner—Julie Anne Watko
(74) Attorney, Agent, or Firm—Morgan, Lewis & Bockius LLP

(57) ABSTRACT

An apparatus is disclosed for driving a lens for use with a disk player to avoid the swing movement of a movable member without the degradation of the sensitivity of an actuator. The apparatus includes magnetic flux producing elements for providing magnetic flux to tracking coils fixed to a lens holder parallel to a focusing direction. The magnetic flux producing elements provide a first magnetic flux to a first area of the coil and a second magnetic flux to a second area of the coil. The first magnetic flux has a direction opposite to that of the second magnetic flux. At least a portion of a boundary surface between the first and the second areas is inclined from a focus direction of the lens.

9 Claims, 18 Drawing Sheets

APPARATUS FOR DRIVING A LENS FOR USE WITH A DISK PLAYER

BACKGROUND OF THE INVENTION

1. Field of the Invention

The present invention relates to an apparatus for driving a lens for use with a disk player for recording information to a disk or reading recorded information therefrom.

2. The Description of Related Art

An apparatus for driving a lens is well-known, including a pickup apparatus for reading information of an optical disk. The lens drive apparatus is for properly correcting a relative position between a track on a disk and an objective lens by driving the objective lens in a focus direction and a tracking direction. The apparatus is driven based on a focus error signal and a tracking error signal.

FIG. 1 shows one example of a conventional apparatus for driving a lens. Numeral 310 designates an actuator base of a magnetic material, and has a suspension base 308 fixed vertically. A lens holder 302 is provided with an objective lens 301, a focusing coil 303, and a tracking coil 304 to form a movable member. The lens holder 302 is coupled to the suspension base 308 through four suspension wires 305 extending in a tangential direction. Therefore, the lens holder 302 is floatingly supported in a cantilever manner, and movable in a focus direction and the tracking direction. It should be noted that the four suspension wires 305 also serve as power feed lines for a driving current to the focusing co 303 and the tracking coil 304.

The actuator base 310 is provided with four projecting pieces to which magnets 311 are fixed, thereby forming a magnetic circuit. The focusing coil 303 and the tracking coil 304 are arranged in a magnetic gap of the magnetic circuit, and has a magnetic flux applied thereto.

In the above-described constitution, when a driving current is supplied to the focusing and tracking coils 303 and 304 in response to focus and tracking error signals, a driving force (electromagnetic force) directed in the focus direction and the tracking direction is generated from these coils. Then, the lens holder 2 is driven, and a servo control for moving the objective lens 1 to a proper position can be performed.

In the lens drive apparatus, an approach is required to avoid a swing phenomenon in which the lens holder 302 is inclined when the lens holder 30 is driven in the tracking direction. That is, as shown in FIG. 2, when the center of gravity G of the movable member is not on an action line F of a tracking driving force, a drawback occurs that the lens holder 302 may swing by a moment force. Therefore, as shown in FIG. 3, The adjustment to move the center of gravity G on the action line F is performed by fixing a counter weight 307 having a desired weight to the lens holder 302.

Furthermore, since the objective lens 301 is fixed to an upper surface of the lens holder 302, the center of gravity G of the movable member is deviated from the center of gravity of the lens holder 302. Therefore, the counter weight 307 is fixed to a lower surface of the lens holder 302, thereby forming a weight balance with respect to the objective lens 1.

However, the above approach increases the weight of the movable member by the weight of the counter weight, since the counter weight 307 is fixed to the lens holder 302. The above problems may causes the degradation of the sensitivity of an actuator, and makes an instantaneous position correction for the objective lens 301 more difficult.

OBJECT AND SUMMARY OF THE INVENTION

An object of the invention is to solve the above problems, and to provide an apparatus for driving a lens without a swing phenomenon and the degradation of the sensitivity of an actuator.

In order to solve the above-described problem, an aspect of the invention is characterized by an apparatus for driving an objective lens for use with a disk player, comprising a movable lens holder provided with driving coils and the objective lens, and a magnetic flux producing assembly for producing magnetic flux to the driving coils to move the objective lens in tracking and focusing directions of a disk, wherein the driving coils comprise at least one set of two tracking coils, each of the tracking coils having a flat coil face, wherein the magnetic flux producing assembly produces a first magnetic flux orthogonal to a coil face of the tracking coil in a first area including a first part of the tracking coil, and a second magnetic flux in a second area including a second part of the tracking coil other than the first part, said second magnetic flux having a direction opposite to that of the first magnetic flux, and wherein at least a portion of a boundary surface between the first and second areas is inclined from a focusing direction of the objective lens.

Another aspect of the present invention is characterized in that an apparatus for driving an objective lens for use with a disk player, comprising a movable lens holder provided with driving coils and the objective lens, and a magnetic flux producing assembly for producing magnetic flux to the driving coils to move the objective lens in tracking and focusing directions, wherein the driving coils comprise at least one set of two tracking coils, each of the tracking coils having a flat coil face, wherein the magnetic flux producing assembly comprises an N pole face and an S pole face in a plane facing to the tracking coil, and at least a part of a boundary surface of the N and the S pole is inclined toward a focusing direction of the objective lens.

A further aspect of the present invention is characterized in that an apparatus for driving an objective lens for use with a disk player, comprising a movable lens holder provided with driving coils and the objective lens, and a magnetic flux producing assembly for producing magnetic flux to the driving coils to move the objective lens in tracking and focusing directions, wherein the driving coils comprise at least one set of two tracking coils, each of the tracking coils having a flat coil face perpendicular to a reading direction of the disk player, wherein the magnetic producing means comprises first and second pole faces placed along the reading direction to form a magnetic gap between the first and second pole faces, in which a part of the tracking coil is placed, and at least a portion of a contour surface between the first and second pole faces is inclined toward a focusing direction of the objective lens.

A still further aspect of the present invention is characterized in that an apparatus for driving an objective lens for use with a disk player, comprising a movable lens holder provided with driving coils and the objective lens, and a magnetic flux producing assembly for producing magnetic flux to the driving coils to move the objective lens in tracking and focusing directions, wherein the driving coils comprise at least one set of two tracking coils, each of the tracking coils having a flat coil face, wherein the magnetic flux producing assembly produces a first magnetic flux orthogonal to a coil face of the tracking coil in a first area including a first part of the tracking coil, a second area including a second part of the tracking coil other than the first part lacking magnetic flux, and wherein at least a portion of a boundary surface between the first and second areas is inclined toward a focusing direction of the objective lens.

As described above, according to the apparatus of the invention, since the swing movement of the movable member can be suppressed without using a counter weight, the weight of he movable member can be reduced. There can be provided a lens drive apparatus having fine sensitivity of an actuator and capable of avoiding the swing movement of the movable member.

BRIEF DESCRIPTION OF THE DRAWINGS

The aforementioned aspects and other features of the invention are explained in the following description, taken in connection with the accompanying drawing figures wherein.

DETAILED DESCRIPTION OF PREFERRED EMBODIMENTS

Figure 1:
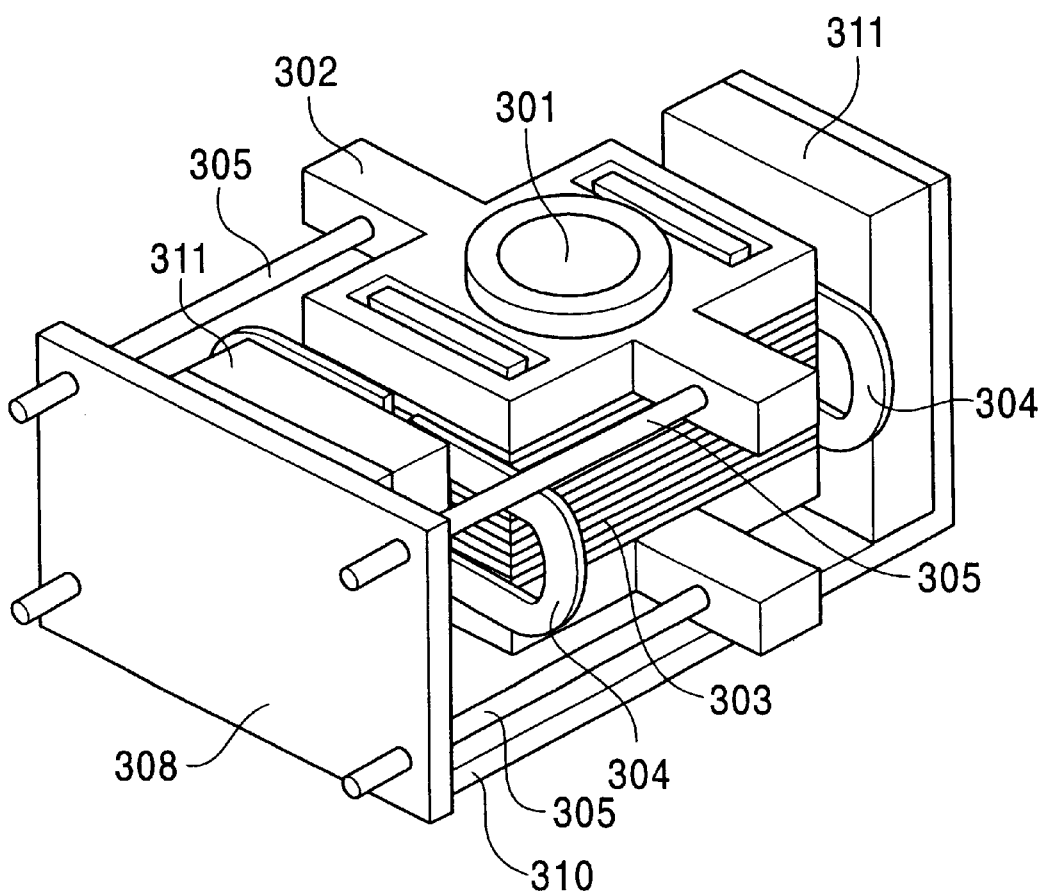
FIG. 1 is a perspective view showing a conventional apparatus for driving a lens.
Figure 2:
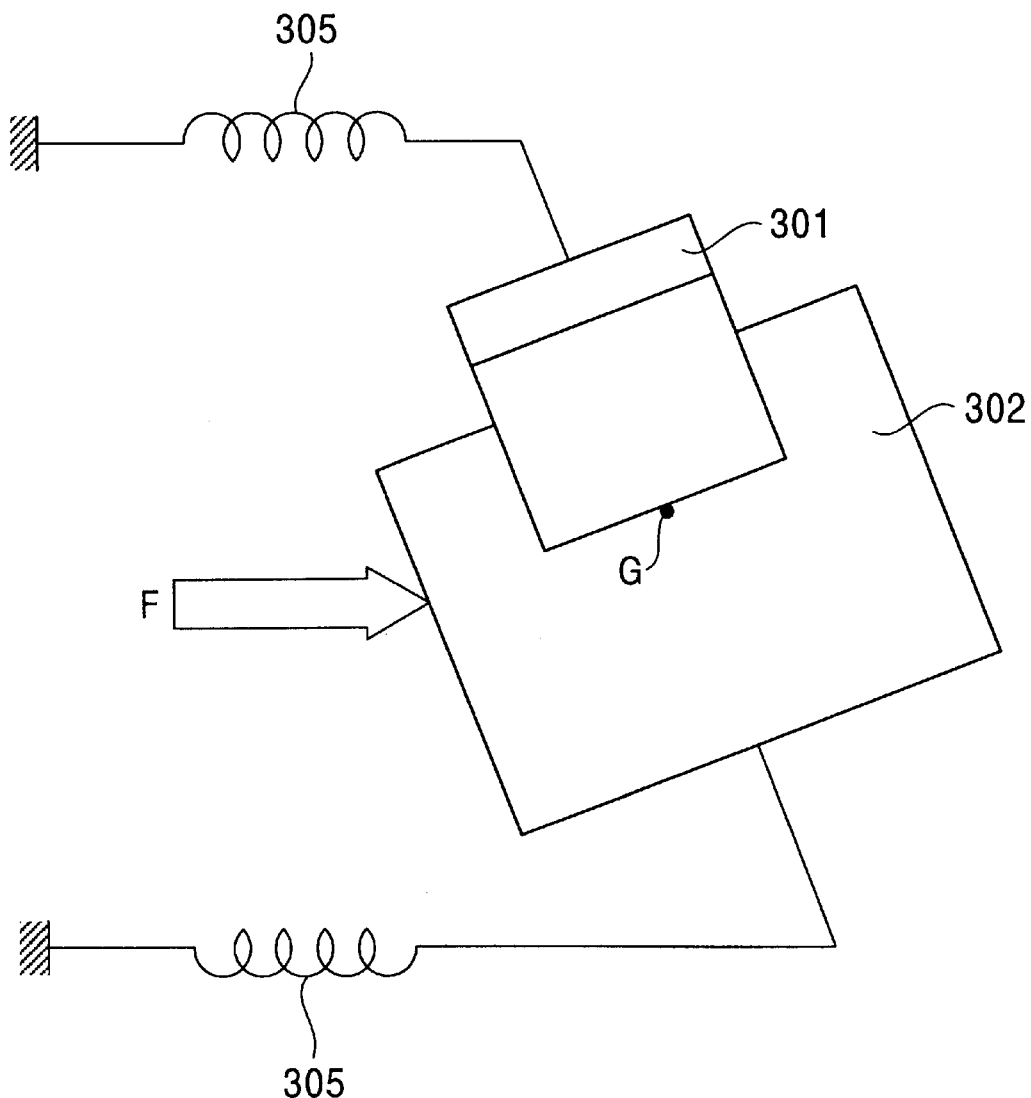
FIG. 2 is a scheme explaining the conventional apparatus.
Figure 3:
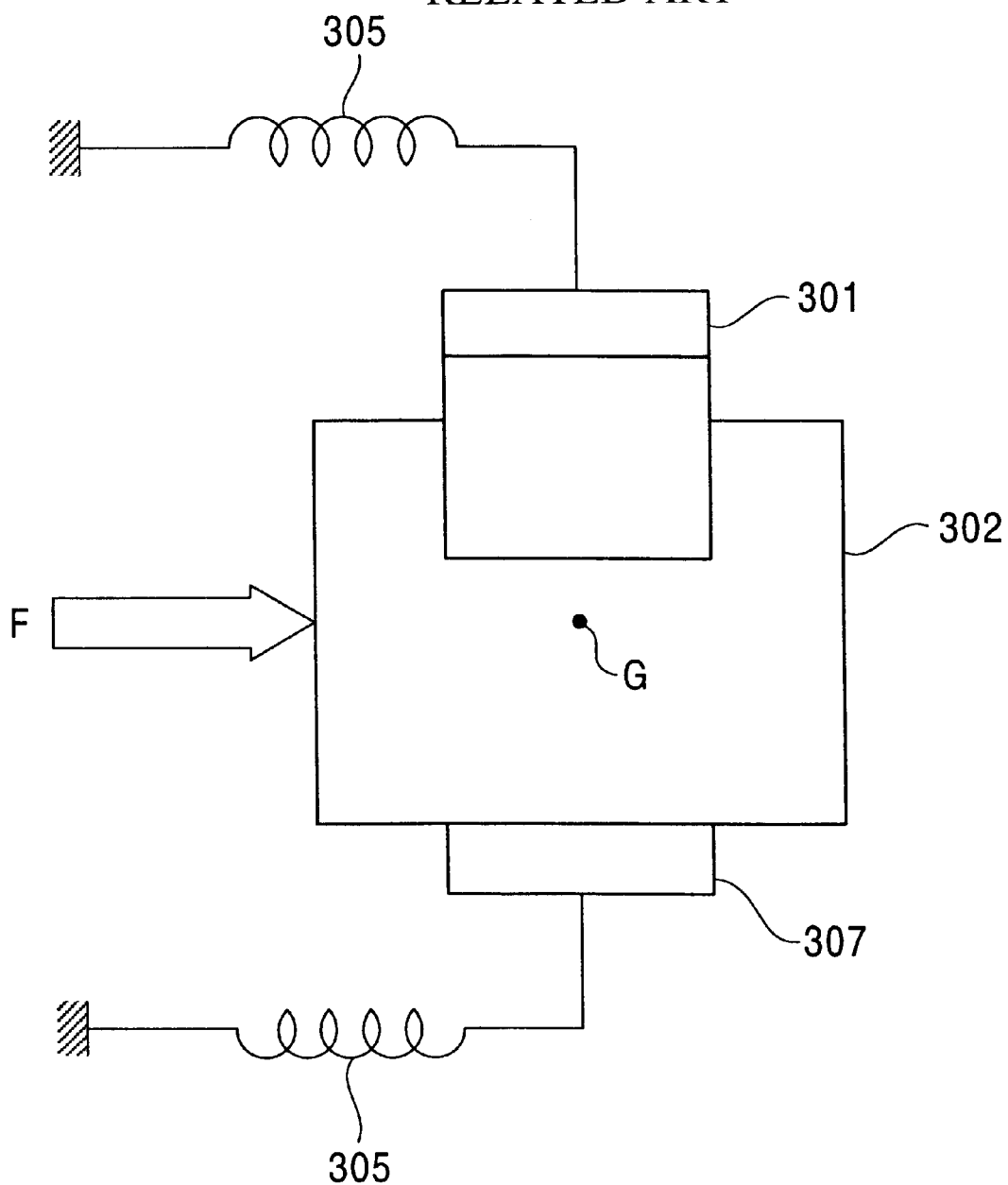
FIG. 3 is a scheme explaining the conventional apparatus for driving a lens.
Figure 4:
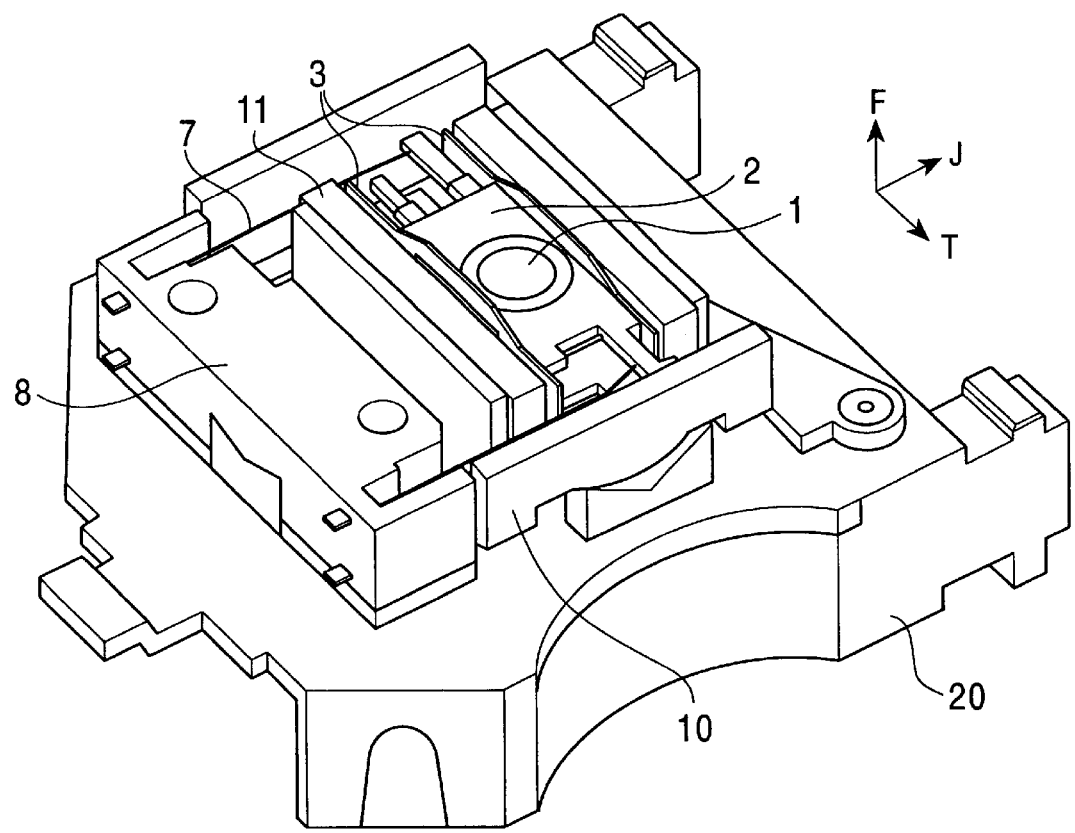
FIG. 4 is a perspective view showing a first embodiment of an apparatus according to the present invention for driving a lens.
Figure 5:
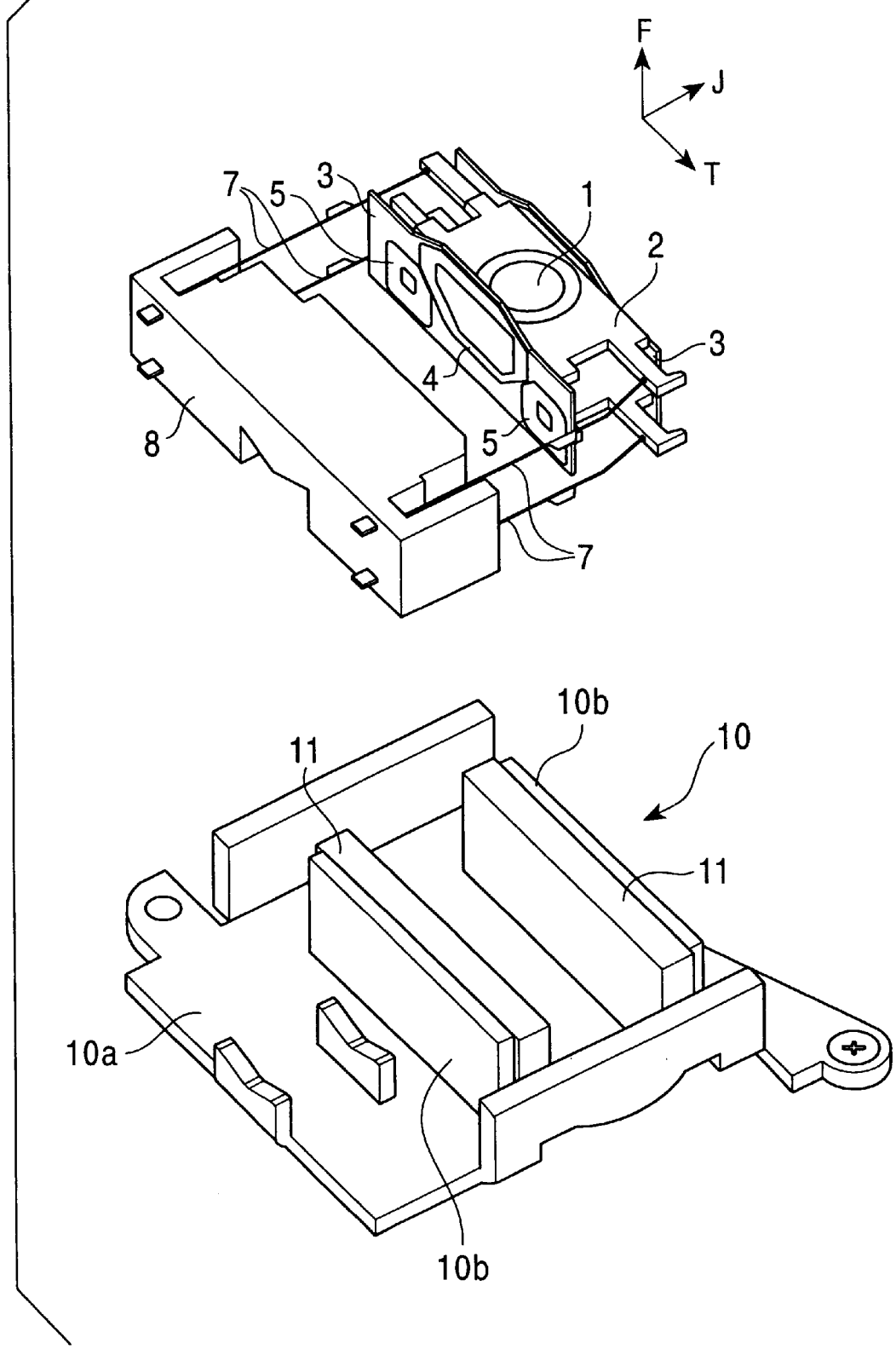
FIG. 5 is an exploded perspective view showing the apparatus of FIG. 4.
Figure 6:
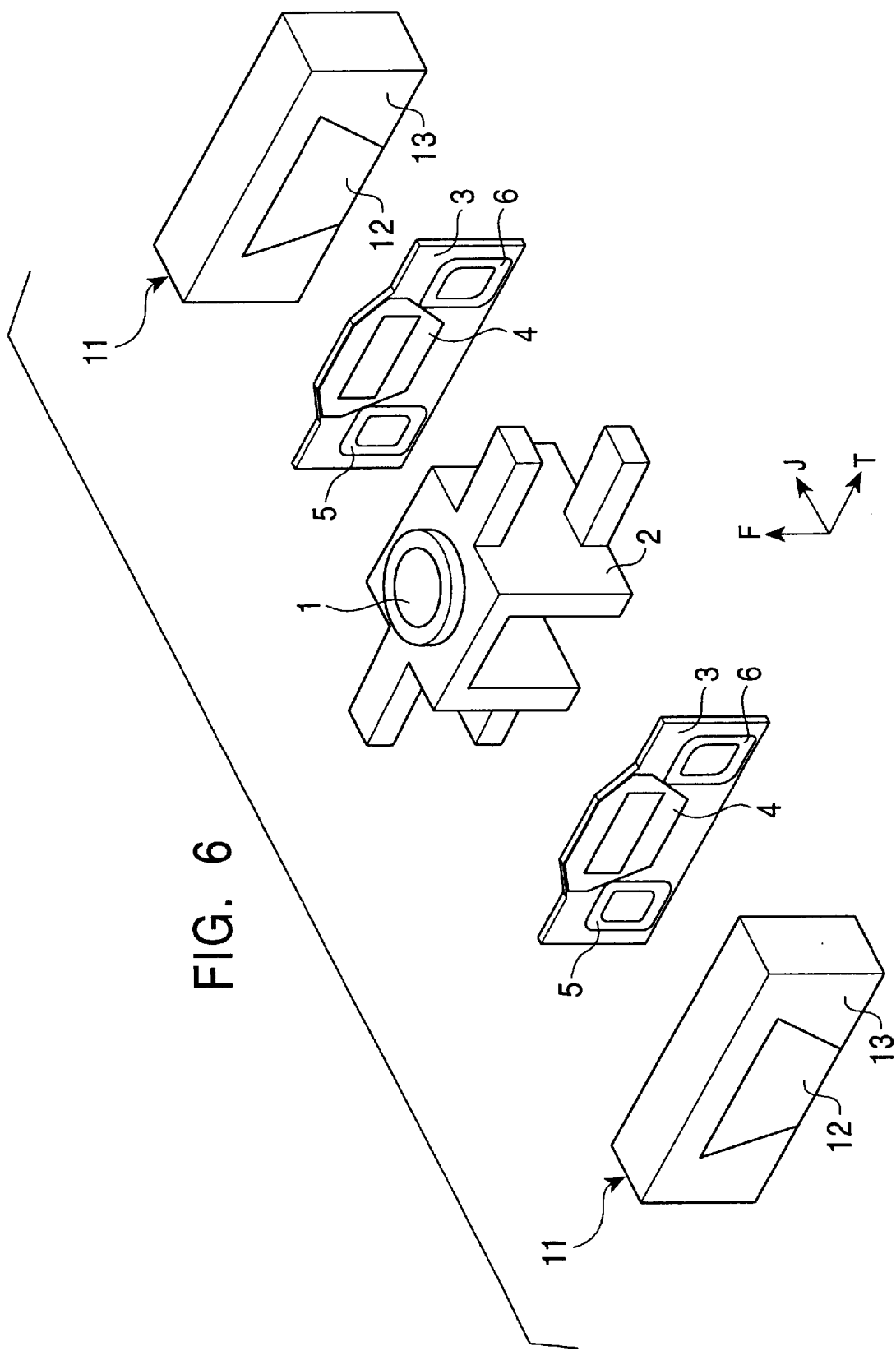
FIG. 6 is an exploded perspective view showing the lens drive apparatus of FIG. 4.

The following description will be made for explaining preferred embodiments of the present invention in conjunction with the drawings. FIGS. 4–6 show a first embodiment of an apparatus for driving a lens for use with a disk player according to the present invention. FIG. 4 is a perspective general view of the apparatus. FIG. 5 is an exploded perspective view of an actuator. FIG. 6 is an exploded perspective view of a movable member. It should be noted that arrows F, T, and J in all drawings of the present invention designate a focusing direction, a tracking direction, and a tangential direction defined by the relationship between the apparatus of FIG. 4 and a disk to be read thereby.

A lens holder 2 comprises an objective lens 1 at an upper face thereof, and a pair of flat coils 3 provided on a side thereof to form a movable portion in an actuator. The flat coil 3 comprises one focusing coil 4 and a pair of two tracking coils 5 and 6 formed on a plane printed circuit board. The flat coil 3 is arranged such that a surface of the board attached in the holder 2 is orthogonal to the tangential direction. The details of the flat coil 3 will be described later.

The lens holder 2 is coupled to a suspension base 8 through four suspension wires 7 extending in the tangential direction. Thereby, the lens holder 2 is floatingly supported in a cantilever manner, and is movable in the focus direction and the tracking direction. Furthermore, the four suspension wires 7 serve also as power feed lines of a driving current to the focusing coil 4 and the tracking coils 5 and 6.

An actuator base 10 is made of a magnetic material, and comprises a fixing portion 10a and a pair of magnet fixing portions 10b spaced from each other along the tangential direction. Magnets 11 are fixed to sides of the pair of fixing portions 10b facing each other. Pole faces 12 and 13 of the magnet are positioned perpendicularly to the tangential direction. The lens holder 2 is arranged in a floating state between the pair of magnets 11. As shown in FIG. 6, coil faces of the focusing coil 4 and the tracking coils 5, 6 face the pole faces 12, 13 in parallel thereto. Furthermore, the actuator base 10 is positioned and fixed to an optical body 20 containing a laser diode and a photodetector in order to guide an optical beam to the objective lens 1.

Figure 7:
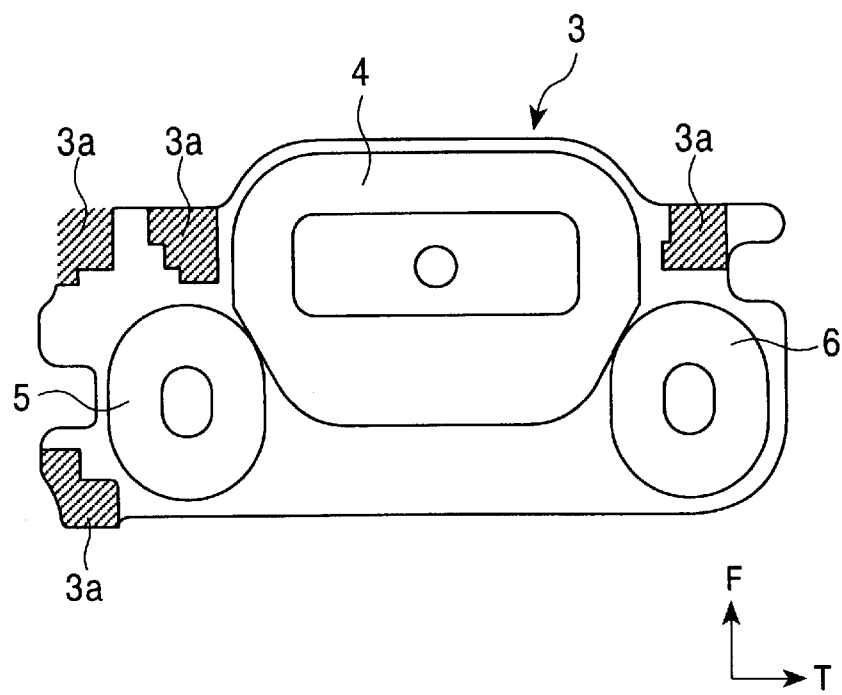
FIG. 7 is a view showing coils on a printed circuit board of the apparatus of FIG. 4.
Figure 8:
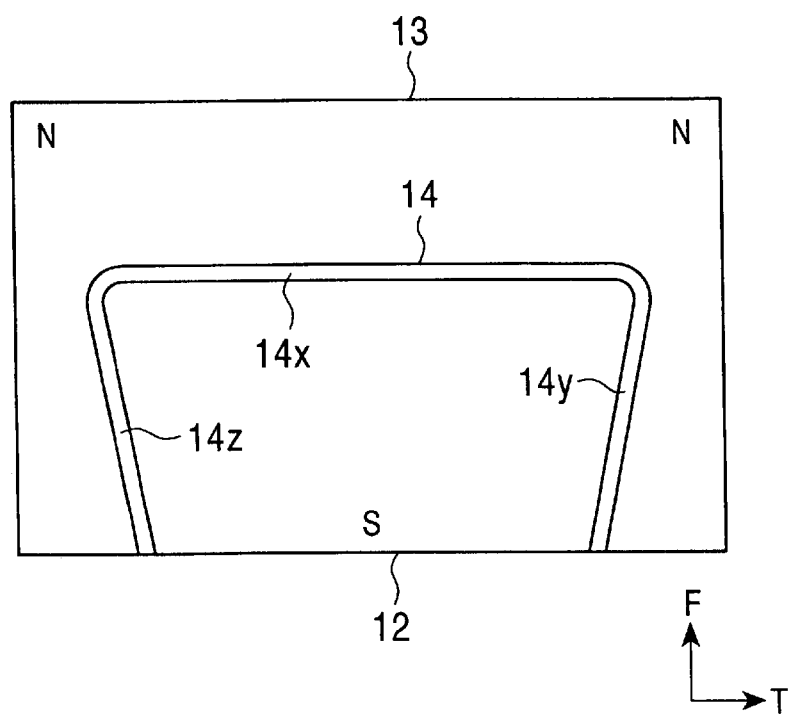
FIG. 8 is a view showing a magnet of the apparatus of FIG. 4.
Figure 9:
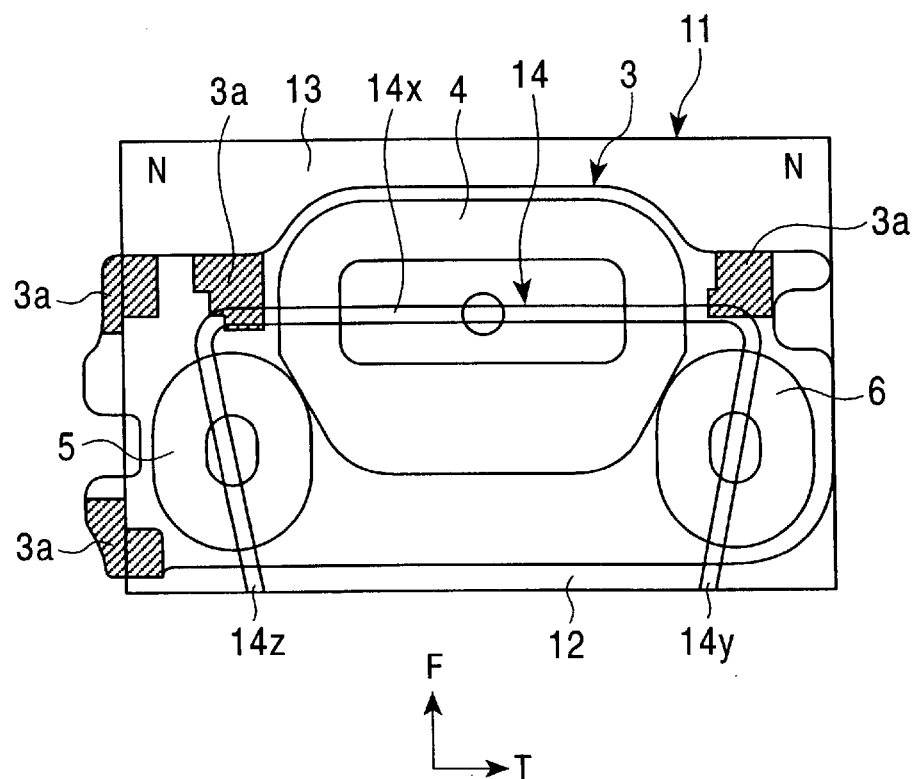
FIG. 9 is a view showing an arrangement of the coils on the printed circuit board and the magnet in the apparatus of FIG. 4.

Next, an explanation will be given of specific arrangements of the flat coil 3 and the magnet 11 according to the present embodiment with reference to FIGS. 7–9. FIG. 7 is a plane view showing the flat coil 3. FIG. 8 is a plane view showing the pole face of the magnet 11. FIG. 9 is a plane view showing an arrangement of the flat coil 3 and the magnet 11.

As shown in FIG. 7, the flat coils 3 comprise single focusing coil 4, two tracking coils 5 and 6 with the same shape, and four coil terminals 3a.

The focusing coil 4 and the tracking coils 5, 6 have a planer shape, and a symmetrical track shape with respect to a straight line along the focus direction. Furthermore, the two tracking coils 5 and 6 are aligned in the tracking direction. Furthermore, the four coil terminals 3a are connected to the suspension wires 7 to feed power to the focusing coil 4 and the tracking coils 5 and 6. Each of the terminals constitutes an input terminal for a focus driving current, an output terminal for the focus driving current, an input terminal for the tracking driving current, and an output terminal of tracking driving current. It should be noted that the circuit board has connection lines connecting the focusing coil 4 and the tracking coils 5, 6 to the corresponding coil terminals 3a, however for simple illustration thereof, they are not shown in the drawings.

As shown in FIG. 8, the magnet 11 has an S pole face 12, an N pole face 13, and a magnetizing boundary surface 14 between the faces 12 and 13. The S pole face 12 has a substantially inverse trapezoid shape, and the N pole face 13 has a substantially inverse U shape surrounding the S pole face 12 from three directions The magnetizing boundary surface 14 is formed such that its upper side 14x comprises a straight line in parallel with the tracking direction, and sides 14y and 14z constitute symmetrical inclined straight lines with respect to an imaginary straight line along the focus direction. Furthermore, the magnetizing boundary surface 14 itself is not magnetized for a reason to be discussed later.

FIG. 9 shows a relative position between the flat coil 3 and the magnet 11, when the lens holder 2 is properly positioned in the apparatus shown in FIG. 4. As shown in FIG. 9, the upper side 14x of the magnetizing boundary line 14 passes through the center of the focusing coil 4, and is positioned to divide the focusing coil 4 into two parts. Similarly, the sides 14y and 14z pass through the centers of the tracking coils 5 and 6, and are positioned to divide each of the tracking coils 5 and 6 into two parts. That is, the focusing coil 4 is provided with two types of magnetic flux, each of which has a direction opposite to each other along the tangential direction (a direction perpendicular to a surface of FIG. 6) with regard to the two parts divided by the upper face 14x. Similarly, the tracking coils 5 and 6 are provided with two types of magnetic flux, each of which has a direction opposite to each other along the tangential direction with regard to the respective two areas divided by the sides 14y and 14z.

Figure 10:
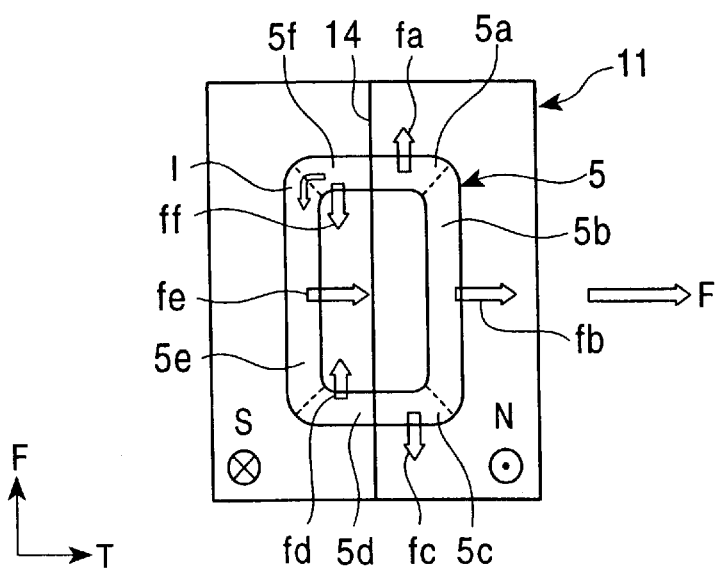
FIG. 10 is a view showing a relationship between a magnetizing boundary line and directions of driving forces generated from the tracking coil.
Figure 11:
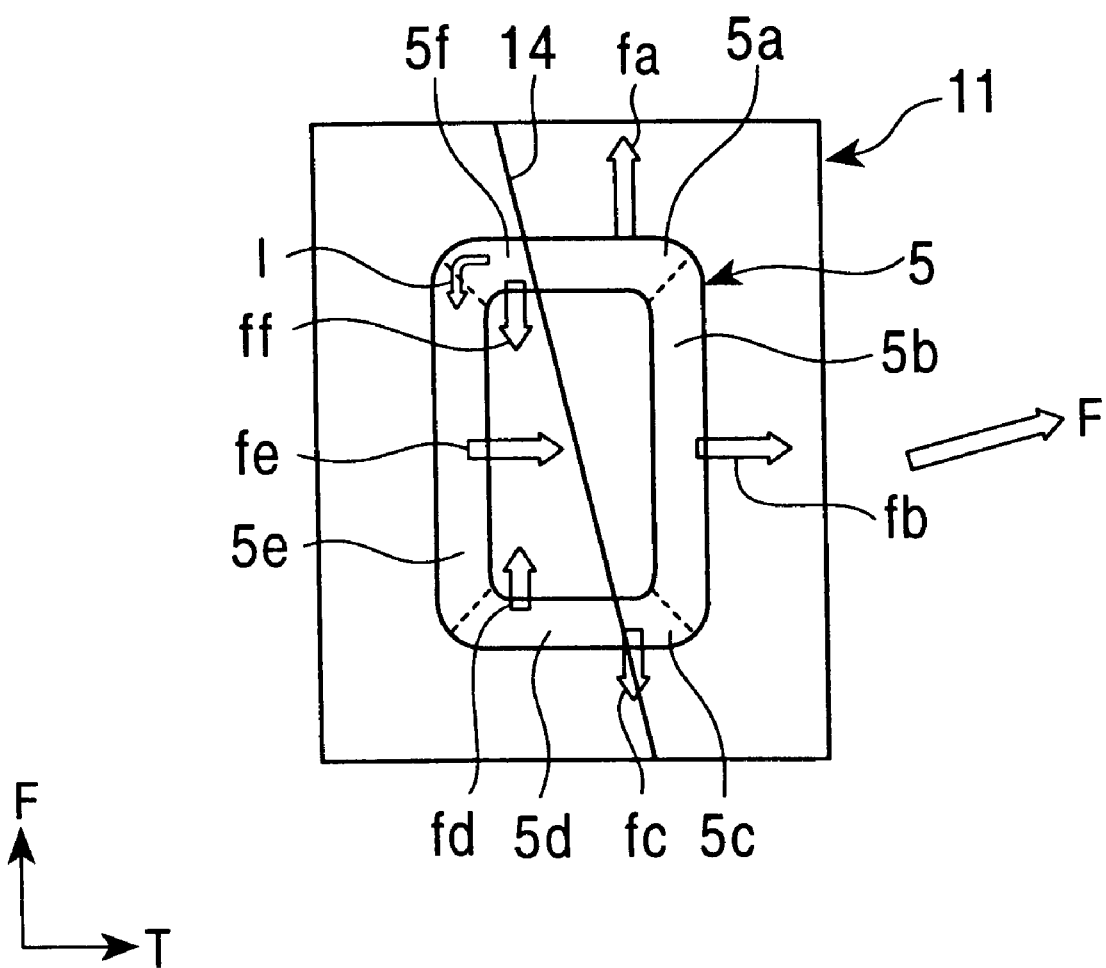
FIG. 11 is a view showing a relationship between a magnetizing boundary line and directions of driving forces generated from the tracking coil.
Figure 12A:
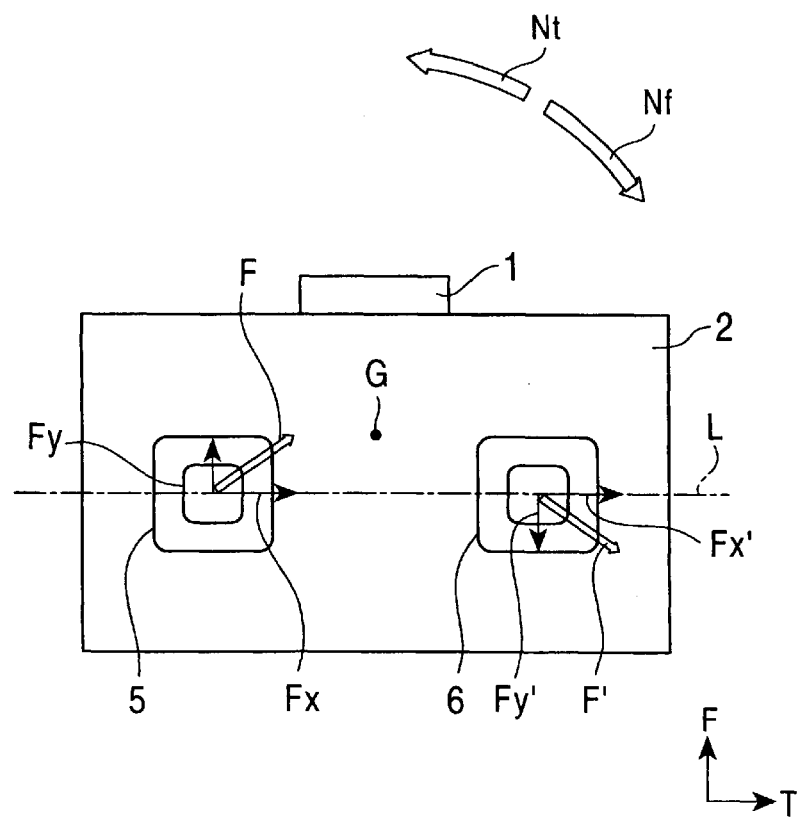
FIGS. 12A and 12B are views explaining the suppression of swing in the apparatus of the first embodiment.
Figure 12B:
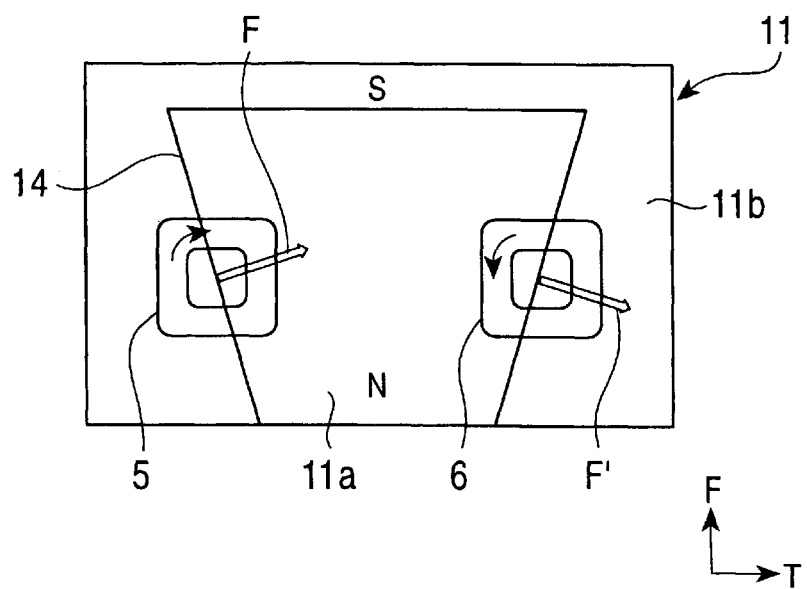

Next, an explanation will be made for a method for preventing the swinging effect according to the present invention with reference to FIGS. 10–12B. FIGS. 10 and 11 are simplified views showing a relationship between a magnetic flux boundary surface and an electromagnetic force. FIGS. 12A and 12B show specific embodiments of canceling the swing. Furthermore, with regard to the pair of flat coils 3, each of the respective focusing coils 4 generates the same driving force. A pair of the tracking coils 5 and 6 generates driving forces having the same magnitude and an opposite direction to each other. Therefore, in the following explanation, a description will be given for the details of the flat coil 3.

The present invention is directed to preventing the swing movement of the movable member caused by incoincidence between the center of gravity of the movable member and the action line of the tracking driving force. A novel concept is to generate a driving force having a focus direction component from the tracking coil, and then generate a rotational moment having a direction opposite to that of the swing movement, thereby canceling the rotational moment which may cause the swing. In order to practice the concept, a driving force having a direction slightly different from the tracking direction of the tracking coil is generated. Furthermore, in this embodiment, by changing the magnetizing boundary line of the magnet 11 relative to the focusing direction, an electromagnetic force generated for a tracking servo control is precisely directed to a desired direction to avoid the swinging of the movable member.

FIGS. 10 and 11 show the relationship between the magnetizing boundary surface 14 crossing the tracking coil 5 and a driving force generated from the tracking coil 5. FIG. 10 is a view showing the magnetizing boundary surface 14 extending parallel to the focus direction. FIG. 11 is a view showing the magnetizing boundary line 14 extending inclined from the focus direction. In FIGS. 10 and 11, notation 5a, 5b, 5c, 5d and 5f respectively designate an upper right side portion, a side right portion, a lower right side portion, a lower left side portion, a left side portion, and an upper left side portion of the tracking coil 5 in this order. Driving force vectors generated from the six portions are designated by arrows fa, fb, fc, fd, fe and ff in this order. A driving force vector synthesized with the vectors fa through ff is designated by an arrow F. Furthermore, a current I flows in the tracking coil 5 in the counterclockwise direction.

In FIG. 10, the driving force fa generated from the upper right side portion 5a of the tracking coil 5 and the driving force generated from the upper left side portion 5f have the same magnitude. However, the force fa has a direction opposite to that of the force from the portion 5f. Similarly, the driving force fc generated from the lower right side portion 5c and the driving force fd generated from the lower left side portion 5d have the same magnitude. However, the force fc has a direction opposite to that of the force fd. Therefore, all of the above forces are canceled by each other. There remain the driving force fb in the tracking direction generated from the right side portion 5b and the driving force fe in the tracking direction generated from the left side portion 5e. As a result, the driving force F generated from the tracking coil 5 is directed in the tracking direction.

In FIG. 11, the driving force fa generated from the upper right side portion 5a of the tracking coil 5 is larger than the driving force gene rated from the upper left side portion 5f. Similarly, the driving force fc generated from the lower right side portion 5c is larger than the driving force fd generated from the lower left side portion 5d. As a result, the synthesized force has a focus direction component. Accordingly, the driving force F generated from the tracking coil 5 has a direction slightly deviated from the tracking direction. Furthermore, accurately, the magnetizing boundary surface 14 is precisely perpendicular to the driving force F.

As is apparent from the above-described explanation, the directions of the driving forces generated from the tracking coils 5 and 6 are established as a function of the inclination of the magnetizing boundary line 10. Therefore, in this embodiment, the direction of the driving force F is set by forming the magnet 11 such that the magnetizing boundary surface 14 is inclined with respect to the focusing direction.

An explanation will be given of a preferred embodiment for canceling the swing of the movable member with reference to FIGS. 12A and 12B. FIG. 12A shows the movable member (the focusing coil 4 is not shown). In FIG. 12A, the center of gravity G is spaced from an action line L i.e., a straight line connecting coil centers of the tracking coils 5 and 6. Therefore if the driving forces generated from the tracking coils 5 and 6 are directed along the tracking direction, a rotational moment is generated in the counterclockwise direction, thereby swinging the movable member.

FIG. 12B is a view showing the arrangement of the coils 5, 6 and the magnet 11. As shown in FIG. 12B, when a current flows in the tracking coil 5 in the clockwise direction, and a current with the same magnitude flows in the tracking coil 6 in the counterclockwise direction, the tracking coil 5 generates a driving force F, which has a focusing direction component. And the tracking coil 6 generates a driving force F' having a focus direction. The force F and the force F' have the same magnitude, but the force F has a direction opposite to that of the force F'. Furthermore, the driving force vectors F and F' are symmetrical with respect to the action line L.

Thereby, the tracking coil 5 generates the driving force F having a tracking direction component Fx, and the tracking coil 6 generates the driving force F' having a tracking direction component Fx'. Therefore, the movable member receives a rotational moment Nt in the counterclockwise direction due to these components of the forces. However, the tracking coil 5 generates the driving force having a focus direction component Fy, and the tracking coil 6 generates a driving force having a focus direction component Fy' which is opposite to that of the force F. Therefore, the movable member receives rotational moment Nf in the clockwise direction due to the focusing direction components. Therefore, when the magnetizing boundary line is inclined such that Nt equals Nf, the moments Nt and Nf can be canceled by each other. Accordingly, the moment force received by the movable member can be eliminated, and the swing phenomenon of the movable member can be suppressed.

Figure 13:
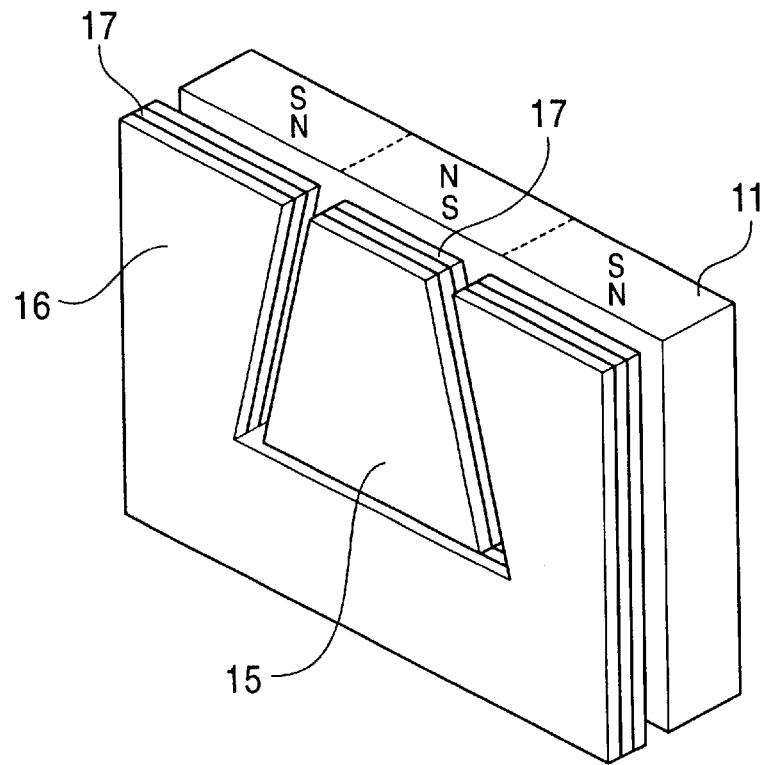
FIG. 13 is a perspective view showing magnetizing means.

Next, an explanation will be given of magnetizing means for forming the magnet 11, in which the magnetizing boundary surface 14 is inclined from the focusing direction with reference to FIGS. 13 and 14. The magnetizing means comprises a first yoke 15, a second yoke 16, and magnetizing coils 17. The first yoke 15 has a substantially inverse trapezoid shape corresponding to the S pole face 12. The second yoke 16 has a substantially inverse U shape surrounding the first yoke 15 from three directions. The magnetizing coils 17, 17 are wound around the first yoke 15 and the second yoke 16, respectively. As shown in FIG. 13, the magnetizing means magnetizes a magnetic body by flowing a current to the magnetizing coils 17 facing a non-magnetized magnetic substance.

Figure 14:
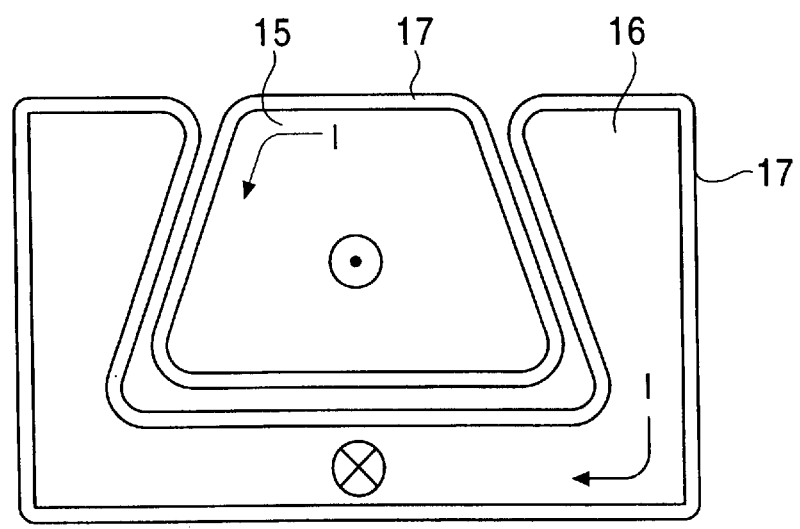
FIG. 14 is a scheme showing the magnetizing means.

Furthermore, as shown in FIG. 14, when a current flows in the magnetizing coil 17 wound around the first yoke 15 in the counterclockwise direction, and a current flows in the magnetizing coil 17 of the second yoke 16 in the clockwise direction, magnetic force lines are generated in the first and second yoke 15, 16 in the directions illustrated. While the magnetic substance is magnetized by the magnetic force lines, the magnet 11 is available. Furthermore, although there is a small gap between the first yoke 15 and the second yoke 16 for convenience of winding the coils 17, the space in the gap is not magnetized. Therefore, the magnetizing boundary line 14 is not magnetized.

As described above, in the first embodiment of the present invention, by inclining the magnetizing boundary line 14 from the focus direction, the driving forces generated from the tracking coils 5 and 6 have the tracking direction components and the focus direction component. However, the driving force by the coil 5 has a direction opposite to that of the other driving force by the coil 6. Then, a rotational moment produced by tracking direction components and another rotational moment produced by the focus direction components are canceled by each other, which suppresses the swing movement of the movable member. Therefore, adjusting the position of the center of gravity by using a counter weight is not necessary. An actuator having a light-weight movable member with fine sensitivity can be provided. Furthermore, there is no need of coinciding the center of gravity of the movable member with the action line between the coil centers of the coils 5, 6. Therefore, a design for an optical pickup having a high degree of freedom can be performed without any restriction on the positions of the tracking coils 5, 6 to the lens holder 2 and weight of the objective lens.

Furthermore, Nt is set to equal Nf, and the rotational moment is nullified in this embodiment. However, the invention should not be limited to the above constitution. For example, the effect of the invention can be achieved when the rotational moment received by the movable member is reduced more, compared with a conventional apparatus in which the magnetizing boundary line of the magnet extends in the focus direction. Furthermore, it is also within the scope of the present invention to adjust by the counter weight in addition to the application of the invention.

Figure 15A:
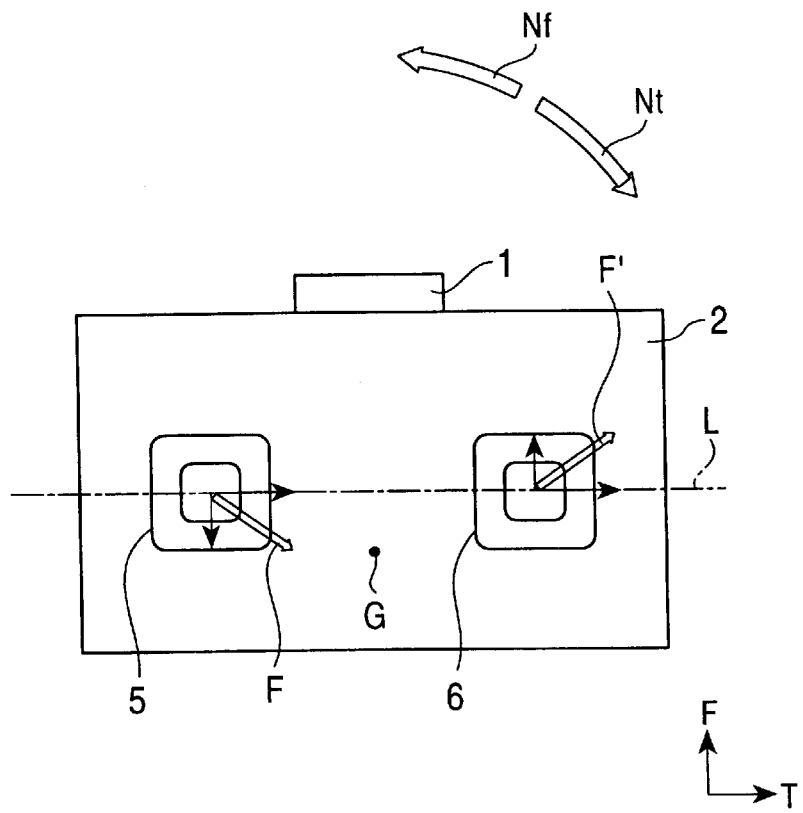
FIGS. 15A and 15B are views explaining the suppression of the swing in a second embodiment of an apparatus according to the present invention.
Figure 15B:
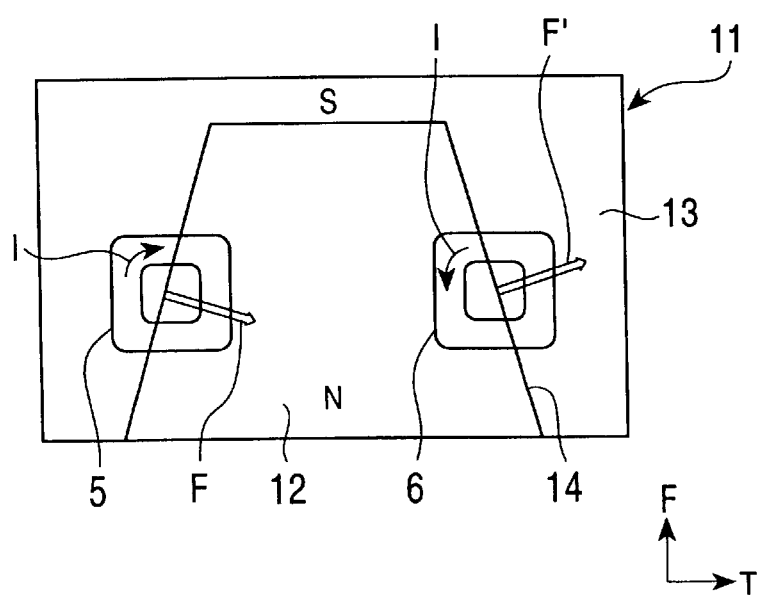

Next, an explanation will be given of a second embodiment of the present invention with reference to FIGS. 15A and 15B. In the second embodiment, the swing movement of the lens holder is suppressed, when the center of gravity G of the movable member is spaced from the action line L, i.e., a straight line connecting coil centers of the coils 5 and 6. FIG. 15A shows the movable member (the focusing coil 4 is not shown). FIG. 15B shows an arrangement of the tracking coils 5, 6 and the magnet.

When the center of gravity G is spaced from the action line L, the rotational moment Nt produced by the tracking direction component of the driving force is in the clockwise direction. Therefore, it is necessary that the rotational moment produced by the focus direction component of the driving force is in the counterclockwise direction. Therefore, in this embodiment, the magnetizing boundary surface 14 is provided such that the N pole face 12 has a substantially trapezoid shape.

By the above-described constitution, when a current flows in the tracking coil 5 in the clockwise direction, and a current having the same magnitude flows in the tracking coil 6 in the counterclock wise direction, the tracking coil 5 generates the driving force F having a focus direction component, and the tracking coil 6 generates the driving force F' having a focus direction component. However, the focus direction component of the force F has a direction opposite to that of the force F'. That is, the driving force F has a force component directed upwardly in the focus direction. The driving force F' has a force component directed downwardly in the focus direction. Therefore, since the movable member receives the rotational moment Nf in the clockwise direction by the tracking components of the above forces, the swing of the movable member can be prevented by canceling Nt and Nf with each other.

Next, an explanation will be given of a third embodiment of an apparatus according to the present invention with reference to FIGS. 16–22. The third embodiment is one example in which an effective magnetic flux range of the magnet 11 is narrow. Generally, in a magnetic flux distribution of a magnet, a magnetic flux density is the highest at the center of a pole face, and lowers towards a periphery area thereof. Therefore, the effective magnetic flux range is limited around the center of the pole face. Therefore, in this embodiment, even when a magnet having a narrow effective magnetic flux range is used, the movable member is readily driven and the swing movement can be suppressed. In this embodiment, the constitution of the magnet 11 is modified from that of the first embodiment.

Figure 16:
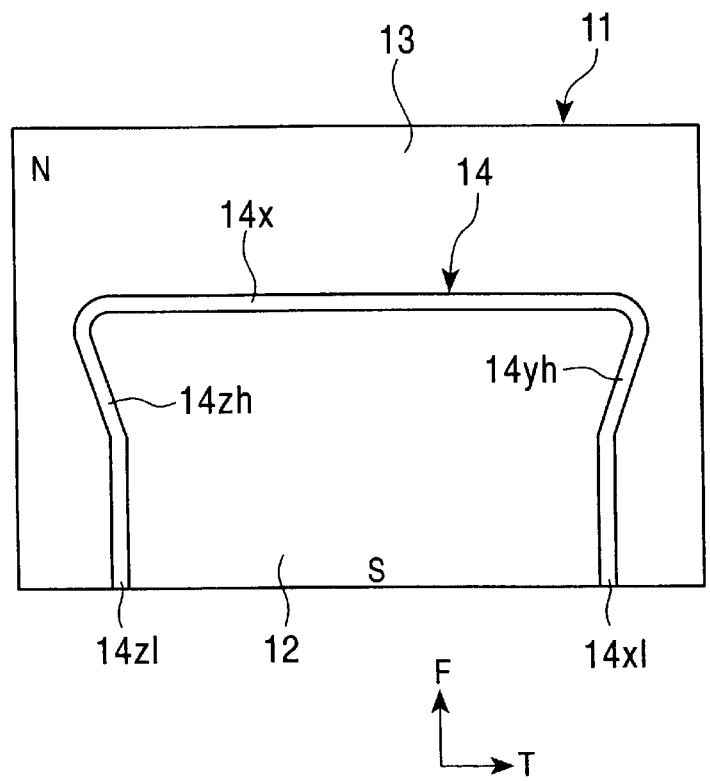
FIG. 16 is a view showing a magnet in a third embodiment of an apparatus according to the present invention.

FIG. 16 shows the magnet 11 in this embodiment. The magnet 11 comprises an S pole face 12, an N pole face 13 and the magnetizing boundary line 14 constituting a boundary line therebetween. The magnet 11 of this embodiment has a structure similar to that of the magnet of the first embodiment except the magnetizing boundary line 14. That is, the magnetizing boundary line 14 has a straight upper side 14x parallel to the tracking direction. The line 14 also has left and right sides comprising inclined straight portions 14yh and 14zh, and vertical straight portions 14y1 and 14x1 extending from the portions 14yh and 14zh in the focus direction. The inclined straight portions 14yh and 14zh are formed to be symmetrical with respect to an imaginary straight line in the focus direction. Furthermore, the magnetizing boundary surface 14 is not magnetized.

Figure 17:
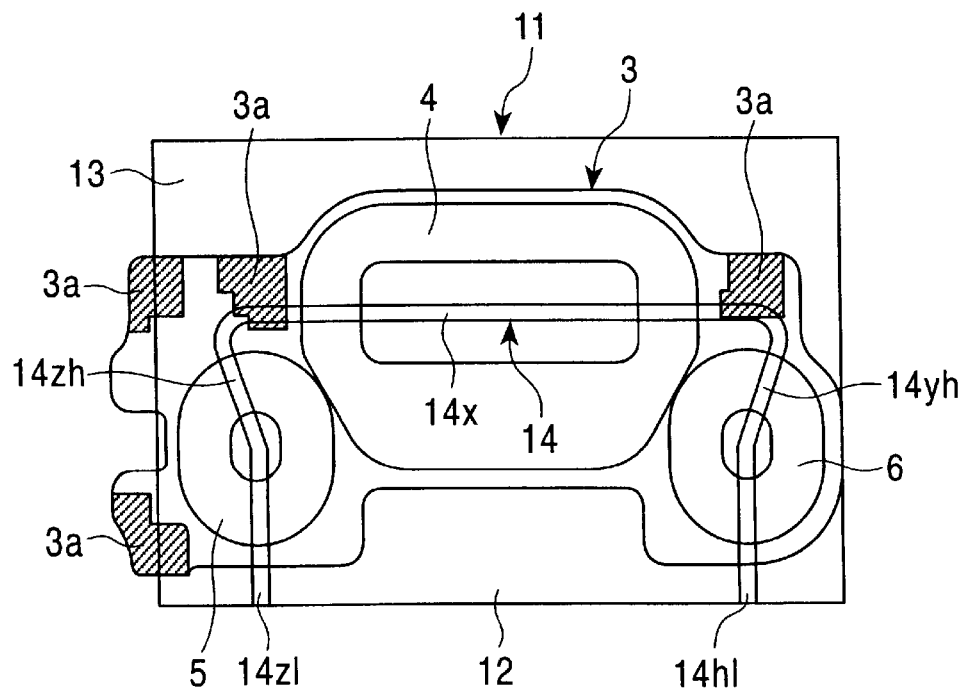
FIG. 17 is a view explaining an arrangement of coils on a printed circuit board and magnet in a third embodiment of an apparatus of the present invention.

FIG. 17 shows an arrangement of the flat coil 3 and the magnet 11 when the lens holder 2 is suitably positioned. As shown in FIG. 17, when the lens holder 2 is positioned at a proper position the center of the tracking coil 5 substantially coincides with a connecting point of the inclined straight line portion 14zh and the vertical straight line portion 14x1. Similarly, the center of the tracking coil 6 also coincides substantially with a connecting point of the inclined straight portion 14yh and the vertical straight portion 14y1.

Figure 18:
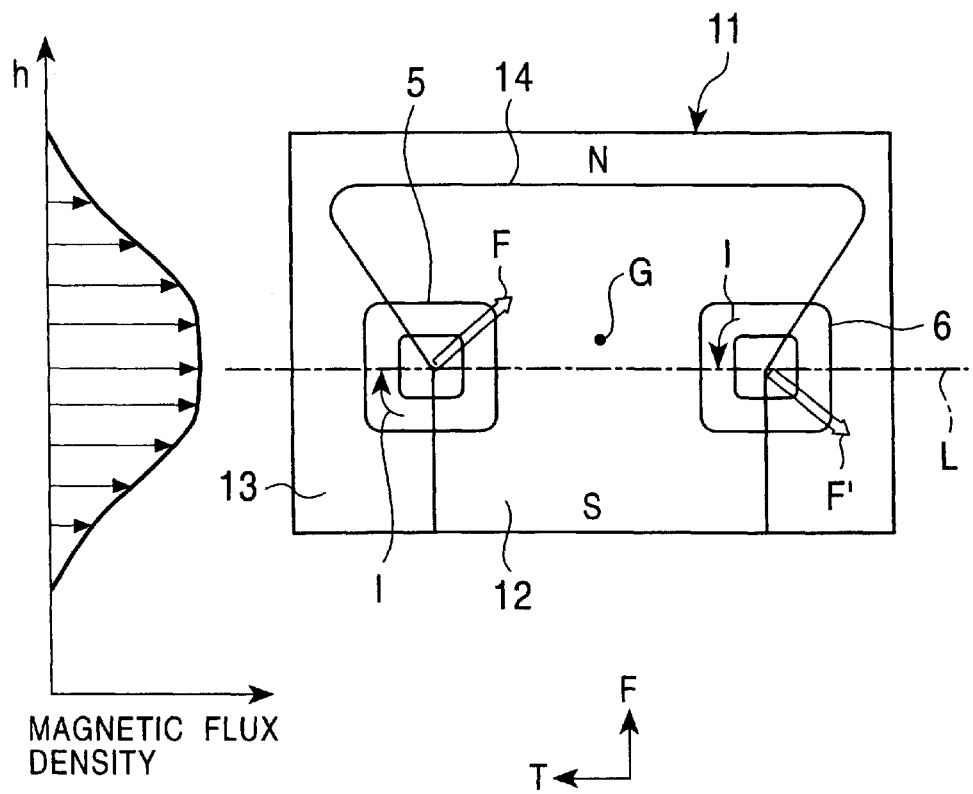
FIG. 18 is a view explaining the suppression of the swing in the third embodiment of the apparatus.
Figure 19:
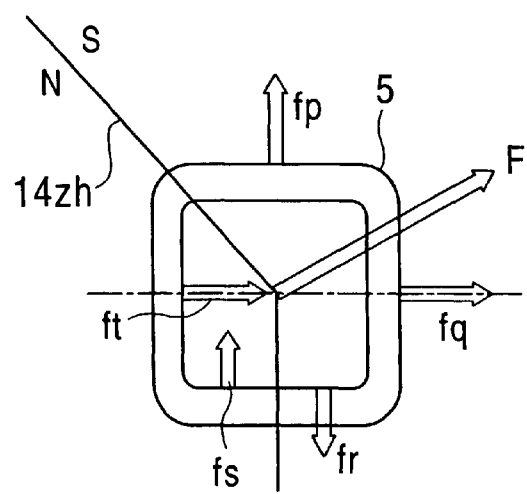
FIG. 19 is a partial enlarged view showing essential portions of FIG. 18.

Next, an explanation will be given of the operation of the apparatus of this embodiment. In the following explanation, the operation of the apparatus of this embodiment is similar to that of the first embodiment. Therefore, the swing movement is suppressed when the center of gravity G of the movable member is spaced from the action line L of the tracking direction driving force. FIG. 18 shows the movable member disposed at the proper position with respect to the focus direction when a tracking servo control is performed FIG. 18 also shows a magnetic flux density distribution along the focus direction of the magnet 11. FIG. 19 is an enlarged view showing the tracking coil 5.

As shown in FIG. 19, the tracking coil 5 faces the S pole face 12 and the N pole face 13, however, a coil surface facing the S pole face 12 is larger than a coil surface facing the N pole face 13. Furthermore, when a current flows in the tracking coil 5 in the counterclockwise direction, the tracking coil 5 generates the following forces; an electromagnetic force fp in the focus direction from an upper side thereof, an electromagnetic force fq in the tracking direction from a right side thereof, an electromagetic force fr in the focus direction, an electromagnetic force fs in the focus direction from a lower side thereof, and an electromagnetic force ft in the tracking direction from a left side thereof. Therefore, the coil generates a driving force F having a focusing direction component and a tracking direction component. Furthermore, the tracking coil 6 generates the driving force F' having a focusing direction component and a tracking direction component. The focusing direction component of the force F has a direction opposite to that of the force F'. Therefore, an accurate tracking servo control suppressing the swing is performed.

Figure 20:
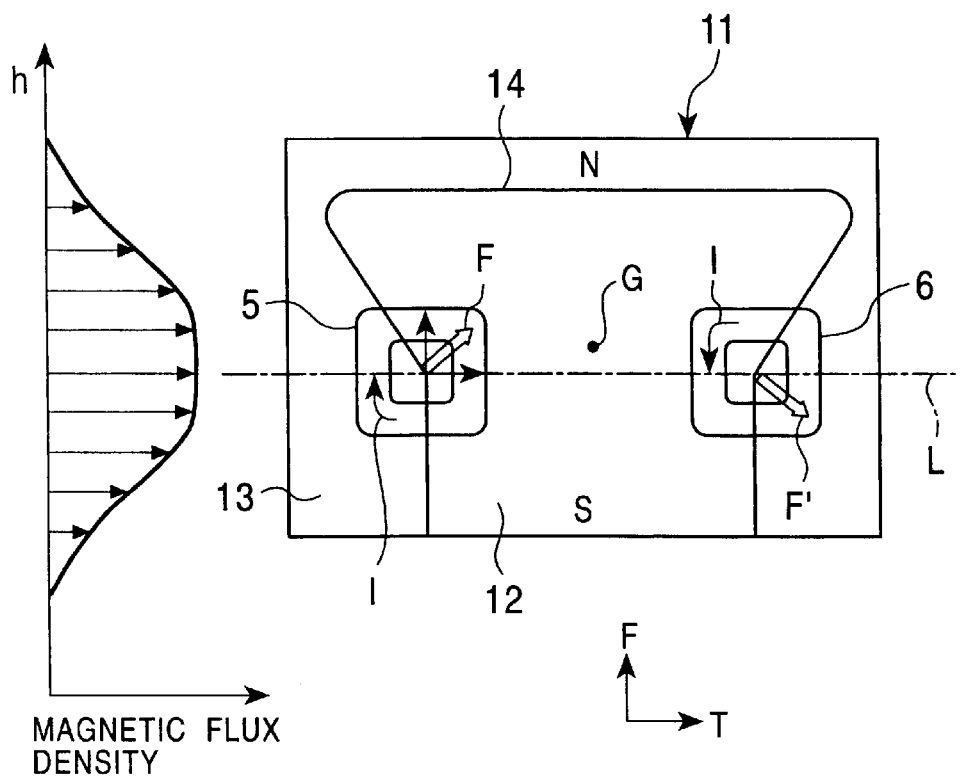
FIG. 20 is a view explaining the suppression of the swing in the third embodiment of the apparatus.
Figure 21:
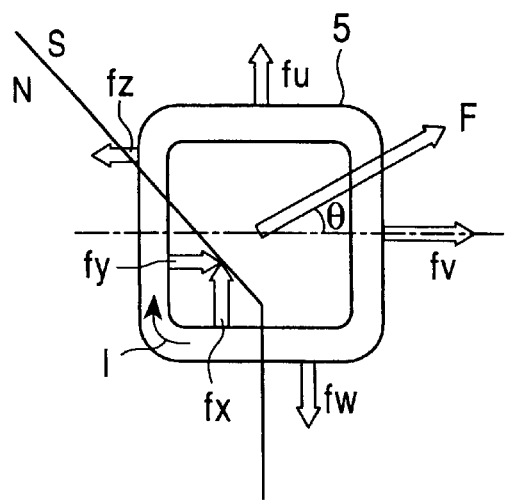
FIG. 21 is a partial enlarged view showing essential portions of FIG. 20.

FIG. 20 shows an arrangement of the magnet 11 and the tracking coils 5 and 6, when the movable member is driven in the focus direction. FIG. 21 is an enlarged view of the tracking coil 5. As illustrated in FIGS. 20 and 21, when the movable member is moved in the focus direction, a left portion of the tracking coil 5 overlaps the S pole face 12. Furthermore, an area of the coil 5 overlapping the S pole face 12 increases, and an area of the coil 5 overlapping the N pole face 13 decreases. Furthermore, when a current flows in the tracking coil 5 in the counterclockwise direction, the tracking coil 5 generates the following forces: an electromagnetic force fu directed in the focus direction, an electromagnetic force fv directed in the tracking direction from a right side thereof, an electromagnetic force fw directed in the opposite direction of the force fu, an electromagnetic force fx directed in the focus direction from a lower side thereof, an electromagnetic force fy directed in the tracking direction and electromagnetic force fz directed in the opposite direction of the force fv from a left side thereof. As a whole, the coil generates a driving force F having a focus direction component and a tracking direction component. Furthermore, the tracking coil 6 similarly generates a driving force F having a focus direction component and a tracking direction component. However, the focusing direction component of the force F has a direction opposite to that of the force F'. Therefore, similar to the case of FIGS. 15A and 15B, there is performed accurate tracking drive with suppressing swing.

Furthermore, when the movable member is displaced upwardly in the focus direction, the movable member is affected by the magnetic flux density distribution. Then, the electromagnetic force fu generated from the upper side of the tracking coil 5 decreases, and the focus direction component of the electromagnetic force F from the coil decreases. However, the tracking direction component of the force F also decreases due to the electromagnetic force fz generated from the left side. Accordingly, the electromagnetic force vector F of the coil has a smaller magnitude and the direction which is unchanged, in comparison with those shown in FIGS. 15A and 15B.

Figure 22:
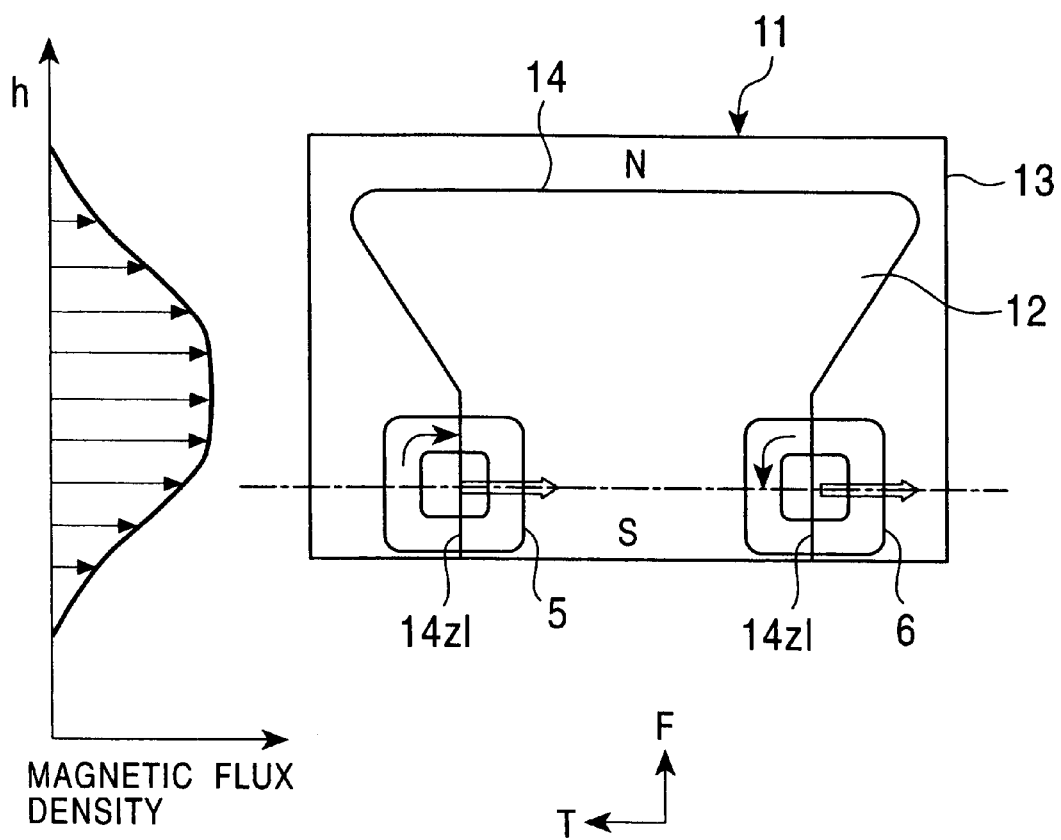
FIG. 22 is a view explaining the suppression of the swing according in the third embodiment of the apparatus.

FIG. 22 shows an arrangement of the magnet 11 and the tracking coil 5 when the movable member is driven downwardly in the focus direction. At this time, each of the tracking coils 5, 6 is divide into two parts by a vertical line portions 14z1 and 14y1 of the magnetizing boundary line 14. Accordingly, the directions of the magnetic force F and F' are aligned with the tracking direction. However, because the action line L moves and approaches the coil centers by influence of the magnetic flux density distribution, the rotational moment received by the movable member is reduced, and the swing movement of the movable member can be suppressed.

As described above, in the apparatus of the third embodiment, the swing movement of the movable member is suppressed by utilizing the fact that the operation line L moves due to the influence of the magnetic flux distribution. Such an arrangement is preferable when using a magnet having a narrow effective magnetic flux range.

Figure 23:
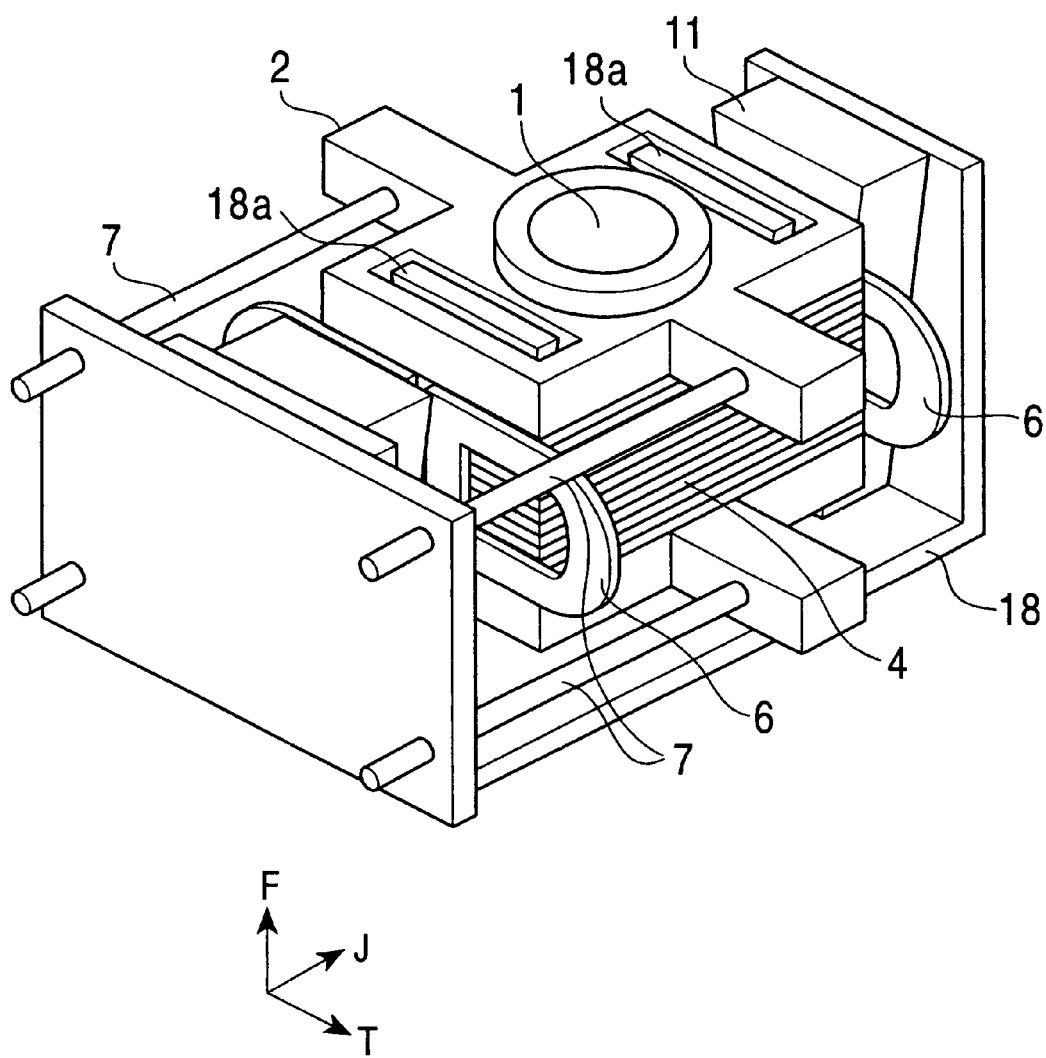
FIG. 23 is a perspective view showing a fourth embodiment of apparatus according to the present invention for driving a lens.
Figure 24:
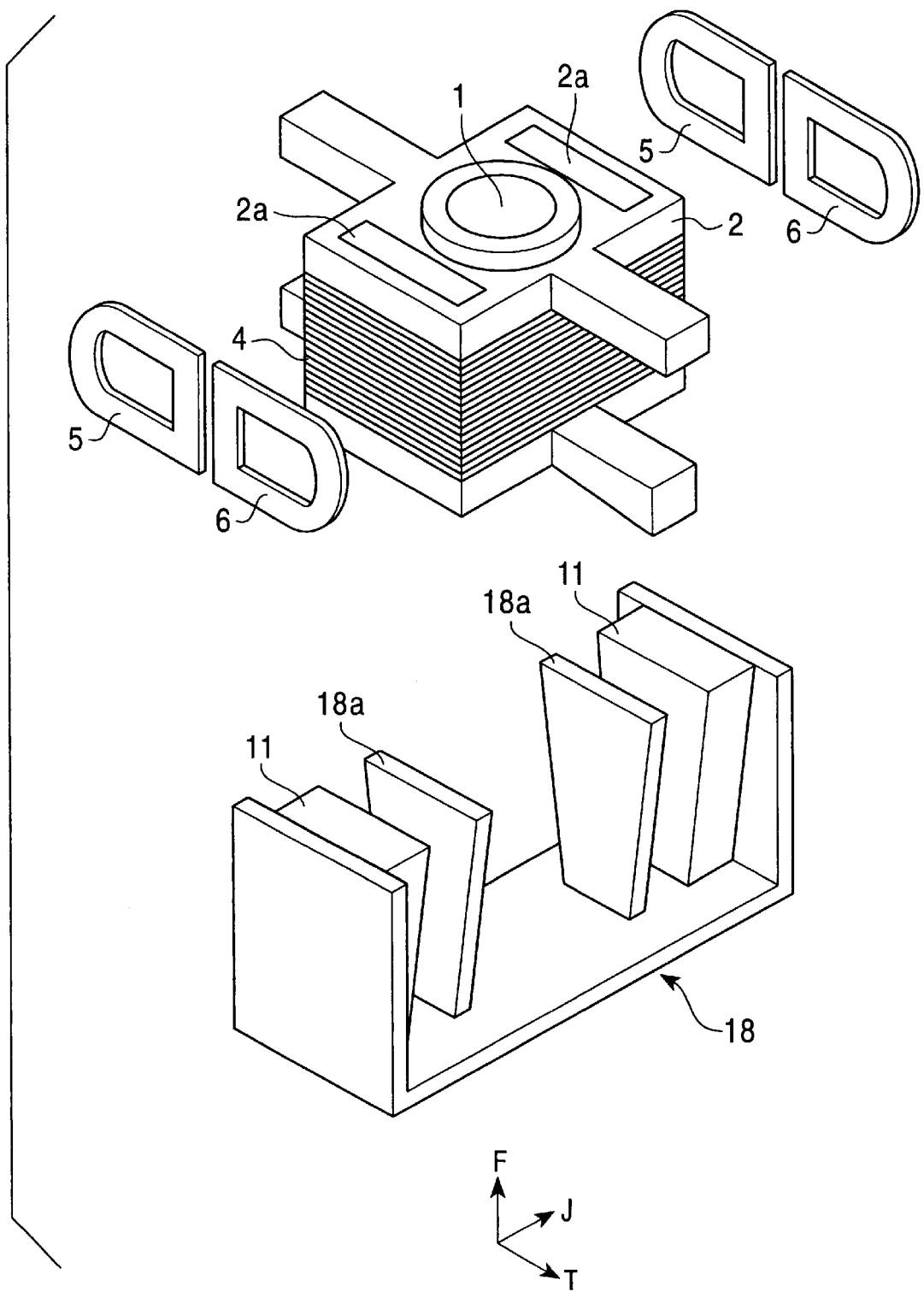
FIG. 24 is an exploded perspective view showing the apparatus of FIG. 23.

Next, an explanation will be given of an apparatus of a fourth embodiment according to the invention with reference to FIGS. 23 and 24. The fourth embodiment is an application in which an apparatus for driving a lens uses a magnetic circuit having a magnetic gap. FIG. 23 is a perspective view of an apparatus for driving a lens, and FIG. 24 is an exploded perspective view of the apparatus of FIG. 23.

The lens holder 2 comprises a pair of insertion holes 2a, an objective lens 1, a focusing coil 4, and pairs of tracking coils 5 and 6. The tracking coils 5, 6 are positioned in a manner to overlap the focusing coil 4. Furthermore, the lens holder 2 is floatingly supported in a cantilever manner by four suspension wires 7. The magnetic circuit comprises a yoke 18 and a pair of the magnets 11. Magnetic gaps are fore between the magnets 11 and erected portions 18a of the yoke 18. The apparatus in this embodiment is characterized in that the magnetic gap has a section of an inverse trapezoid shape. The magnets 11 and the erected portion 18a have the same inverse trapezoid shape.

As shown in FIG. 23, the erected portions 18a are inserted into the insertion holes 2a. The focusing coil 4 and the tracking coils 5, 6 are disposed in the magnetic gap. It should be noted that portions of the tracking coils 5 and 6 are in the magnetic gaps, and the other parts of the coils 5, 6 are out of the magnetic gaps. The above structure of the magnetic circuit provides a boundary surface of the magnetic gap area which is inclined to the focus direction. Therefore, similar to the above-described embodiments, the swing movement of the movable member can be restrained.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. For example, the present invention is applicable to an apparatus for driving a lens which comprises only one flat coil. It should be noted that a tracking coil is not limited to a planar shape, but a coil with a curved coil surface can be provided on a side wall of a cylindrical lens holder in a slidable apparatus of a shaft slide type.

What is claimed is:

1. An apparatus for driving an objective lens for use with a disk player, comprising a movable lens holder provided with driving coils and the objective lens, and a magnetic flux producing assembly for producing magnetic flux to the driving coils to move the objective lens in tracking and focusing directions of a disk,
    wherein the driving coils comprise at least one set of two tracking coils, each of the tracking coils having a flat coil face,
    wherein the magnetic flux producing assembly produces a first magnetic flux orthogonal to a coil face of each of the tracking coils in a first area including a first part of each of the tracking coils, and a second magnetic flux in a second area including a second part of each of the tracking coils other than the first part, said second magnetic flux having a direction opposite to that of the first magnetic flux, and
    wherein at least a portion of a boundary surface between the first and second areas is inclined from a focusing direction of the objective lens.

2. An apparatus according to claim 1, wherein each of the tracking coils is formed in a surface orthogonal to a reading direction of the disk player, and both of the first and the second magnetic flux are parallel with each other along the reading direction.

3. An apparatus according to claim 2, wherein each of the tracking coils is a flat coil formed on a printed circuit board, the printed circuit board being placed perpendicularly to a tangential direction of the disk.

4. An apparatus according to claim 2, wherein the magnetic flux producing assembly comprises an N pole face and an S pole face in a plane facing to each of the tracking coils, and a boundary line of the N and the S pole faces is on the boundary surface between the first and the second areas.

5. An apparatus according to claim 3, wherein the magnetic flux producing assembly comprises an N pole face and an S pole face in a plane facing to each of the tracking coils, and a boundary line of the N and the S pole faces is on a boundary surface between the first and the second areas.

6. An apparatus according to claim 1, wherein the magnetic flux producing assembly comprises first and second pole faces placed along a tangential direction of the disk to form a magnetic gap between the first and second pole faces, in which a portion of each of the tracking coils is disposed, and the first and second pole faces have a complementary shape.

7. An apparatus for driving an objective lens for use with a disk player, comprising a movable lens holder provided with driving coils and the objective lens, and a magnetic flux producing assembly for producing magnetic flux to the driving coils to move the objective lens in tracking and focusing directions,
    wherein the driving coils comprise at least one set of two tracking coils, each of the tracking coils having a flat coil face,
    wherein the magnetic flux producing assembly comprises an N pole face and an S pole face in a plane facing to each of the tracking coils, and at least a part of a boundary surface of the N and the S pole is inclined toward a focusing direction of the objective lens.

8. An apparatus for driving an objective lens for use with a disk player, comprising a movable lens holder provided with driving coils and the objective lens, and a magnetic flux producing assembly for producing magnetic flux to the driving coils to move the objective lens in tracking and focusing directions,
    wherein the driving coils comprise at least one set of two tracking coils, each of the tracking coils having a flat coil face perpendicular to a reading direction of the disk player,
    wherein the magnetic flux producing assembly comprises first and second pole faces placed along the reading direction to form a magnetic gap between the first and second pole faces, in which a part of each of the tracking coils is placed, and at least a portion of a contour surface between the first and second pole faces is inclined toward a focusing direction of the objective lens.

9. An apparatus for driving an objective lens for use with a disk player, comprising a movable lens holder provided with driving coils and the objective lens, and magnetic flux producing assembly for producing magnetic flux to the driving coils to move the objective lens in tracking and focusing directions,
    wherein the driving coils comprise at least one set of two tracking coils, each of the tracking coils having a flat coil face,
    wherein the magnetic flux producing assembly produces a first magnetic flux orthogonal to a coil face of each of the tracking coils in a first area including a first part of each of the tracking coils, a second area including a second part of each of the tracking coils other than the first part lacking magnetic flux, and
    wherein at least a portion of boundary surface between the first and second areas is inclined toward a focusing direction of the objective lens.

* * * * *